(12) United States Patent
Mamchuk et al.

(10) Patent No.: US 12,240,492 B2
(45) Date of Patent: Mar. 4, 2025

(54) METHODS AND SYSTEMS FOR VEHICLE CONTROL UNDER DEGRADED LANE PERCEPTION RANGE

(71) Applicant: GM GLOBAL TECHNOLOGY OPERATIONS LLC, Detroit, MI (US)

(72) Inventors: Tetyana V Mamchuk, Walled Lake, MI (US); Paul A Adam, Milford, MI (US); Reza Zarringhalam, Whitby (CA); Zhi Li, Unionville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 18/063,650

(22) Filed: Dec. 8, 2022

(65) Prior Publication Data
US 2024/0190459 A1    Jun. 13, 2024

(51) Int. Cl.
*B60W 60/00* (2020.01)
*B60W 40/105* (2012.01)
*G06V 20/56* (2022.01)

(52) U.S. Cl.
CPC ........ *B60W 60/001* (2020.02); *B60W 40/105* (2013.01); *G06V 20/588* (2022.01)

(58) Field of Classification Search
CPC .. B60W 60/001; B60W 40/105; G06V 20/588
USPC ........................................................ 701/23
See application file for complete search history.

(56) References Cited

U.S. PATENT DOCUMENTS

| | | | | |
|---|---|---|---|---|
| 2015/0217801 A1* | 8/2015 | Takeda | ................... | B62D 6/003 701/42 |
| 2016/0107682 A1* | 4/2016 | Tan | ................. | B60W 30/18163 701/41 |
| 2019/0251373 A1* | 8/2019 | Lee | ........................ | G08G 1/167 |
| 2021/0031760 A1* | 2/2021 | Ostafew | ............... | G05D 1/0088 |
| 2021/0365701 A1* | 11/2021 | Eshet | ................... | G06V 20/588 |
| 2022/0379920 A1* | 12/2022 | Yang | ................. | B60W 60/0015 |
| 2023/0079624 A1* | 3/2023 | Maeda | ............... | B60W 60/001 701/25 |

* cited by examiner

*Primary Examiner* — Behrang Badii
*Assistant Examiner* — Helen Li
(74) *Attorney, Agent, or Firm* — Lorenz & Kopf LLP

(57) ABSTRACT

Methods and systems of controlling a vehicle. The methods and systems include switching to a second processor executed mode in response to determining that a range of perception information extends to a range end point that is closer to the vehicle than a first Look Ahead (LA) point. In the second processor executed mode: a motion planner requests a lateral controller to provide a closer LA point relative to the vehicle. The lateral controller determines the closer LA point and sends the closer LA point to the motion planner. The lateral controller generates control commands for an EPS system based on an error between a desired trajectory and an actual trajectory at the closer LA point. The motion planner generates the desired trajectory based on perception data and the closer LA point.

20 Claims, 8 Drawing Sheets

METHODS AND SYSTEMS FOR VEHICLE CONTROL UNDER DEGRADED LANE PERCEPTION RANGE

The present disclosure generally relates to automated lateral and longitudinal control of a vehicle and associated methods and systems, particularly under degraded perception conditions.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. However, it may be desirable to improve control of an autonomous vehicle, for example in controlling steering of an autonomous vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, lane keeping control, super cruise and parking assistance systems correspond to lower automation levels, while true "driverless" vehicles correspond to higher automation levels. Various automated driver assistance systems of different automation levels rely on effective longitudinal and lateral control of the vehicle.

There may be conditions where perception is degraded. Such conditions include environmental conditions like fog, rain, snow, bright sun and other conditions such as imperceptible lane markings, and slope or curvature of the road concealing lane markings from a perception system of the vehicle. Some currently proposed systems may pause automated driving, bring the vehicle to a halt and/or request a human driver to take over control of the vehicle.

Accordingly, it is desirable to provide techniques for lateral control of a vehicle that can maintain movement of the vehicle under degraded perception conditions, continue longitudinal and lateral control of the vehicle over a broader range of degraded perception conditions and to delay or avoid a request to bring a human driver into controlling the vehicle. It is also desirable to provide methods, systems, and vehicles utilizing such techniques in a processing efficient manner. Furthermore, other desirable features and characteristics of the present invention will be apparent from the subsequent detailed description and the appended claims, taken in conjunction with the accompanying drawings and the foregoing technical field and background.

SUMMARY

In one aspect, a vehicle control system for a vehicle is provided. The vehicle control system includes: a sensing system configured to provide vehicle dynamics data; a perception system configured to provide perception data representing a forward looking scene of the vehicle; an Electronic Power Steering (EPS) system; at least one processor in operable communication with the perception system and the EPS system, the at least one processor configured to execute program instructions, wherein the program instructions are configured to cause the at least one processor to implement a motion planner and a lateral controller in a control loop. The program instructions are further configured to cause the at least one processor to: execute a first mode: wherein the motion planner is configured to determine a desired trajectory based on the perception data and to provide the desired trajectory to the lateral controller and the lateral controller is configured to generate control commands for the EPS system based on an error between the desired trajectory and an actual trajectory at a first look-ahead (LA) point. The actual trajectory is determined by the lateral controller based on a vehicle dynamics model and the vehicle dynamics data. The motion planner is configured to receive lane information from the perception system including a range of the lane information. The motion planner is configured to receive the first LA point from the lateral controller. The motion planner is configured to compare the first LA point and the range to determine whether the range extends to a range end point that is closer to the vehicle than the first LA point. The program instructions configured to cause the at least one processor to switch to a second mode in response to determining that the range extends to a range end point that is closer to the vehicle than the first LA point. In the second mode: the motion planner is configured to request the lateral controller to provide a closer LA point relative to the vehicle. The lateral controller is configured to determine the closer LA point and send the closer LA point to the motion planner. The lateral controller is configured to generate the control commands for the EPS system based on the error between the desired trajectory and the actual trajectory at the closer LA point. The motion planner is configured to generate the desired trajectory based on the perception data and the closer LA point.

In embodiments, the lane information includes lane markers that have been classified and located by the perception system.

In embodiments, the program instructions are configured to cause the at least one processor to implement a longitudinal controller. The motion planner is configured to request a velocity decrease to the longitudinal controller in response to switching to the second mode.

In embodiments, the motion planner is configured to simultaneously: request the velocity decrease to the longitudinal controller, and request the lateral controller to provide the closer LA point relative to the vehicle.

In embodiments, the motion planner is configured to generate the desired trajectory based on the perception data and the first LA point in the first mode and the closer LA point in the second mode by combining first and second curves at the first LA point in the first mode and combining the first and second curves at the closer LA point in the second mode.

In embodiments, the first LA point is determined by the lateral controller as a function of speed and curvature of the vehicle as provided in the vehicle dynamics data in the first mode and wherein the closer LA point is determined as a function of speed and curvature of the vehicle as provided in the vehicle dynamics data and a reduction factor in the second mode.

In embodiments, a rate of change of the velocity decrease is rate limited.

In embodiments, the program instructions configured to cause the at least one processor to return to the first mode in response to determining that the range extends to a range end point that is further away from the vehicle than the first LA point.

In embodiments, the motion planner is configured to request the lateral controller to provide a closer LA point relative to the vehicle and includes the range in the request and wherein the lateral controller is configured to determine the closer LA point using the range.

In another aspect, a method of controlling a vehicle is provided. The method comprises: in a first processor executed mode: a motion planner of the vehicle determines a desired trajectory based on perception data provided by a perception system of the vehicle, wherein the perception data is representative of a forward looking scene of the vehicle. The motion planer provides the desired trajectory to a lateral controller of the vehicle and the lateral controller generates control commands for an Electronic Power Steering (EPS) system of the vehicle based on an error between the desired trajectory and an actual trajectory at a first look-ahead (LA) point, wherein the actual trajectory is determined by the lateral controller based on a vehicle dynamics model and vehicle dynamics data provided by a sensing system of the vehicle. The motion planner receives lane information from the perception system including a range of the lane information. The motion planner receives the first LA point from the lateral controller. The motion planner compares the first LA point and the range to determine whether the range extends to a range end point that is closer to the vehicle than the first LA point. The method includes switching to a second processor executed mode in response to determining that the range extends to a range end point that is closer to the vehicle than the first LA point. In the second processor executed mode: the motion planner requests the lateral controller to provide a closer LA point relative to the vehicle. The lateral controller determines the closer LA point and sends the closer LA point to the motion planner, wherein the lateral controller generates the control commands for the EPS system based on the error between the desired trajectory and the actual trajectory at the closer LA point. The motion planner generates the desired trajectory based on the perception data and the closer LA point.

In embodiments, the lane information includes lane markers that have been classified and located by the perception system.

In embodiments, the motion planner requests a velocity decrease to a longitudinal controller of the vehicle in response to switching to the second processor executed mode.

In embodiments, the motion planner simultaneously: requests the velocity decrease to the longitudinal controller, and requests the lateral controller to provide the closer LA point relative to the vehicle.

In embodiments, the motion planner generates the desired trajectory based on the perception data and the first LA point in the first mode and the closer LA point in the second mode by combining first and second curves at the first LA point in the first mode and the first and second curves at the closer LA point in the second mode.

In embodiments, the first LA point is determined by the lateral controller as a function of speed and curvature of the vehicle as provided in the vehicle dynamics data in the first mode and wherein the closer LA point is determined as a function of speed and curvature of the vehicle as provided in the vehicle dynamics data and a reduction factor in the second mode.

In embodiments, a rate of change of the velocity decrease is rate limited.

In embodiments, the method includes returning to the first mode in response to determining that the range extends to a range end point that is further away from the vehicle than the first LA point.

In embodiments, the motion planner requests the lateral controller to provide a closer LA point relative to the vehicle and includes the range in the request and wherein the lateral controller determines the closer LA point using the range.

In another aspect, a vehicle is provided. The vehicle includes: a sensing system configured to provide vehicle dynamics data; a perception system configured to provide perception data representing a forward looking scene of the vehicle; an Electronic Power Steering (EPS) system; and at least one processor in operable communication with the perception system, the sensing system and the EPS system. The at least one processor is configured to execute program instructions. The program instructions are configured to cause the at least one processor to implement a motion planner and a lateral controller in a control loop. The program instructions are further configured to cause the at least one processor to: execute a first mode: wherein the motion planner is configured to determine a desired trajectory based on the perception data and to provide the desired trajectory to the lateral controller and the lateral controller is configured to generate control commands for the EPS system based on an error between the desired trajectory and an actual trajectory at a first look-ahead (LA) point. The actual trajectory is determined by the lateral controller based on a vehicle dynamics model and the vehicle dynamics data. The motion planner is configured to receive lane information from the perception system including a range of the lane information. The motion planner is configured to receive the first LA point from the lateral controller. The motion planner is configured to compare the first LA point and the range to determine whether the range extends to a range end point that is closer to the vehicle than the first LA point. The program instructions are configured to cause the at least one processor to switch to a second mode in response to determining that the range extends to a range end point that is closer to the vehicle than the first LA point. In the second mode: the motion planner is configured to request the lateral controller to provide a closer LA point relative to the vehicle. The lateral controller is configured to determine the closer LA point and send the closer LA point to the motion planner. The lateral controller is configured to generate the control commands for the EPS system based on the error between the desired trajectory and the actual trajectory at the closer LA point. The motion planner is configured to generate the desired trajectory based on the perception data and the closer LA point.

In embodiments, the motion planner is configured to request the lateral controller to provide a closer LA point relative to the vehicle and includes the range in the request and wherein the lateral controller is configured to determine the closer LA point using the range.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
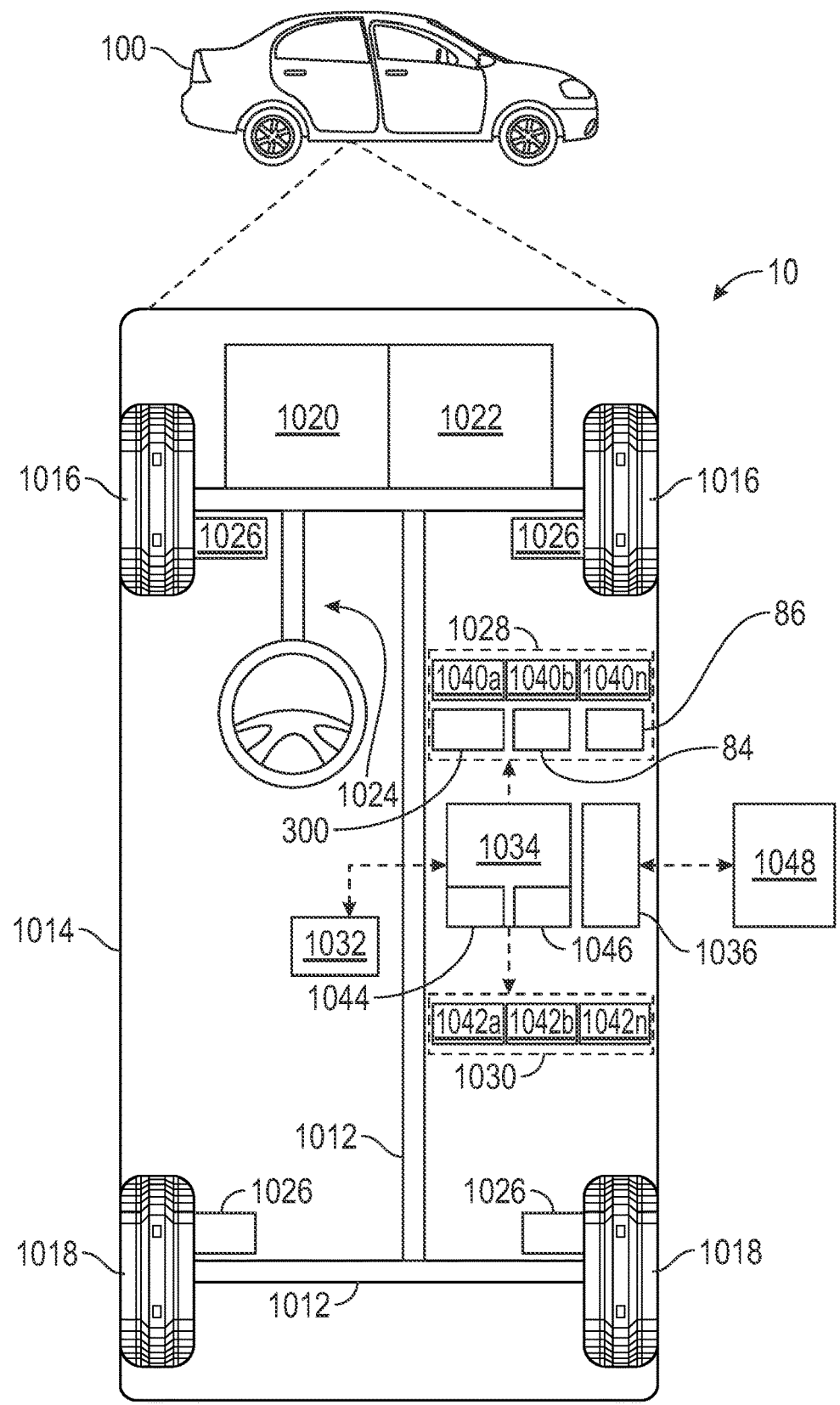
FIG. 1 is a functional block diagram illustrating a vehicle having a vehicle control system, in accordance with various embodiments.

With reference to FIG. 1, a vehicle control system shown generally at 10 is associated with a vehicle 100 in accordance with various embodiments. In general, the vehicle control system 10 determines when there is a perception gap between a LA point from a lateral controller and a provided range of a perception system and requests a closer LA point to bridge the perception gap. At the same time, a request is made to reduce speed of the vehicle. In this way, automated control of the vehicle can be continued in perception degraded conditions.

As depicted in FIG. 1, the vehicle 100 generally includes a chassis 1012, a body 1014, front wheels 1016, and rear wheels 1018. The body 1014 is arranged on the chassis 1012 and substantially encloses components of the vehicle 100. The body 1014 and the chassis 1012 may jointly form a frame. The wheels 1016-1018 are each rotationally coupled to the chassis 1012 near a respective corner of the body 1014.

In various embodiments, the vehicle 100 is an autonomous vehicle and the vehicle control system 10 is incorporated into the vehicle 100 (hereinafter referred to as the vehicle 100). In other embodiments, the vehicle 100 is a semi-autonomous vehicle having automated features of an Advanced Driver Assistance System (ADAS) that relies on lateral vehicle control (such as lane keeping assistance and hands off driving). The vehicle 100 is, for example, a vehicle that is automatically controlled to carry passengers from one location to another. The vehicle 100 is depicted in the illustrated embodiment as a passenger car, but it should be appreciated that any other vehicle including trucks, sport utility vehicles (SUVs), recreational vehicles (RVs), etc., can also be used.

In an exemplary embodiment, the vehicle 100 is a so-called Level Three, Level Four or Level Five automation system. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 100 generally includes a propulsion system 1020, a transmission system 1022, a steering system 1024, a braking system 1026, a sensing system 1028, an actuator system 1030, at least one data storage device 1032, at least one controller 1034, and a communication system 1036. The propulsion system 1020 may, in various embodiments, include an internal combustion engine, an electric machine such as a traction motor, and/or a fuel cell propulsion system. The transmission system 1022 is configured to transmit power from the propulsion system 1020 to the vehicle wheels 1016-1018 according to selectable speed ratios. According to various embodiments, the transmission system 1022 may include a step-ratio automatic transmission, a continuously-variable transmission, or other appropriate transmission. The braking system 1026 is configured to provide braking torque to the vehicle wheels 1016-1018. The braking system 1026 may, in various embodiments, include friction brakes, brake by wire, a regenerative braking system such as an electric machine, and/or other appropriate braking systems.

The steering system 1024 influences a position of the of the vehicle wheels 1016-1018. While depicted as including a steering wheel for illustrative purposes, in some embodiments contemplated within the scope of the present disclosure, the steering system 1024 may not include a steering wheel. The steering system 1024 may include an EPS system 80 (see FIG. 5). In some embodiments, the EPS system 80 has an electric steering motor mounted to an axle 1050 that provides electric steering assist in response to a vehicle driver turning the steering wheel in a manner that is well understood in the art. In other words, when the vehicle driver turns the steering wheel, the EPS system 80 turns the wheels 1016 and 1018 the amount commanded by the vehicle driver so that the turning of the wheels 1016 and 1018 on the roadway is easier. As would be well understood by one of ordinary skill in the art, the EPS system 80 electrically assists a driver in the steering of the vehicle by applying a variable motor torque command to the steering motor and, as needed, a torque overlay command (TOC) that alters the value of the motor torque command during an EPS-assisted steering maneuver. In other, or combination, embodiments, a motor of the EPS system 80 provides the steering torque for collision avoidance steering, lane keeping assist and other ADAS features described herein and also for autonomous driving steering depending on the application and the level of autonomy of the vehicle 100. In one embodiment, the EPS system 80 is responsive to instructions from a controller 1034 and is configured to provide overall EPS system 80 control.

The sensing system 1028 includes one or more sensing devices 1040a-1040n that sense observable conditions of the exterior environment and/or the interior environment of the vehicle 100. The sensing devices 1040a-40n can include, but are not limited to, radars, lidars, global positioning systems, optical cameras, thermal cameras, ultrasonic sensors, and/or other sensors. The sensing devices 140a-40n can include optical cameras, thermal cameras, ultrasonic sensors, radars and/or lidars as part of a perception system 300 providing perception data 302 (see FIG. 3) representative of a scene ahead of the vehicle 100. The sensing system 1028 includes an HWA (Hand Wheel Angle or Road Wheel Angle) sensor 84 that provides a measure of Hand Wheel Angle. The HWA sensor may be a steering angle sensor mounted to a steering column that measures the rotation of the steering wheel 1024 and the steering column and provides a steering angle signal indicative of same. A driver applied torque sensor may be mounted to the steering column that measures the torque on the steering column and provides a torque signal indicative of same. Alternately, instead of using a steering angle sensor to provide the steering angle, a pinion angle (PA) sensor can be employed to provide the steering angle, which gives a more direct measurement of road wheel angle, as is well understood by those skilled in the art.

The vehicle dynamics sensors 86 provide vehicle dynamics data 90 including longitudinal speed, yaw rate, lateral acceleration, longitudinal acceleration, etc. The vehicle dynamics sensors 86 may include wheel sensors that measure information pertaining to one or more wheels of the vehicle 100. In one embodiment, the wheel sensors comprise wheel speed sensors that are coupled to each of the wheels of the vehicle 100. Further, the vehicle dynamics sensors 86 may include one or more accelerometers (provided as part of an Inertial Measurement Unit (IMU)) that measure information pertaining to an acceleration of the vehicle 100. In various embodiments, the accelerometers measure one or more acceleration values for the vehicle 100, including latitudinal and longitudinal acceleration and yaw rate.

The actuator system 1030 includes one or more actuator devices 42a-42n that control one or more vehicle features such as, but not limited to, the propulsion system 1020, the transmission system 1022, the steering system 1024, and the braking system 1026. In various embodiments, the vehicle features can further include interior and/or exterior vehicle features such as, but are not limited to, doors, a trunk, and cabin features such as air, music, lighting, etc. (not numbered).

The communication system 1036 is configured to wirelessly communicate information to and from other entities 1048, such as but not limited to, other vehicles ("V2V" communication,) infrastructure ("V2I" communication), remote systems, and/or personal devices. In an exemplary embodiment, the communication system 1036 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 1032 stores data for use in automatically controlling the vehicle 100. In various embodiments, the data storage device 1032 stores defined maps of the navigable environment. In various embodiments, the defined maps may be predefined by and obtained from a remote system. For example, the defined maps may be assembled by the remote system and communicated to the vehicle 100 (wirelessly and/or in a wired manner) and stored in the data storage device 1032. As can be appreciated, the data storage device 1032 may be part of the controller 1034, separate from the controller 1034, or part of the controller 1034 and part of a separate system.

The controller 1034 includes at least one processor 1044 and a computer readable storage device or media 1046. The processor 1044 can be any custom made or commercially available processor, a central processing unit (CPU), a graphics processing unit (GPU), an auxiliary processor among several processors associated with the controller 1034, a semiconductor based microprocessor (in the form of a microchip or chip set), a macroprocessor, any combination thereof, or generally any device for executing instructions. The computer readable storage device or media 1046 may include volatile and nonvolatile storage in read-only memory (ROM), random-access memory (RAM), and keep-alive memory (KAM), for example. KAM is a persistent or non-volatile memory that may be used to store various operating variables while the processor 1044 is powered down. The computer-readable storage device or media 1046 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 1034 in controlling the vehicle 100.

The instructions may include one or more separate programs, each of which comprises an ordered listing of executable instructions for implementing logical functions. The instructions, when executed by the processor 1044, receive and process signals from the sensing system 1028, perform logic, calculations, methods and/or algorithms for automatically controlling the components of the vehicle 100, and generate control signals to the actuator system 1030 to automatically control the components of the vehicle 100 based on the logic, calculations, methods, and/or algorithms. Although only one controller 1034 is shown in FIG. 1, embodiments of the vehicle 100 can include any number of controllers 1034 that communicate over any suitable communication medium or a combination of communication mediums and that cooperate to process the sensor signals, perform logic, calculations, methods, and/or algorithms, and generate control signals to automatically control features of the vehicle 100.

Figure 3:
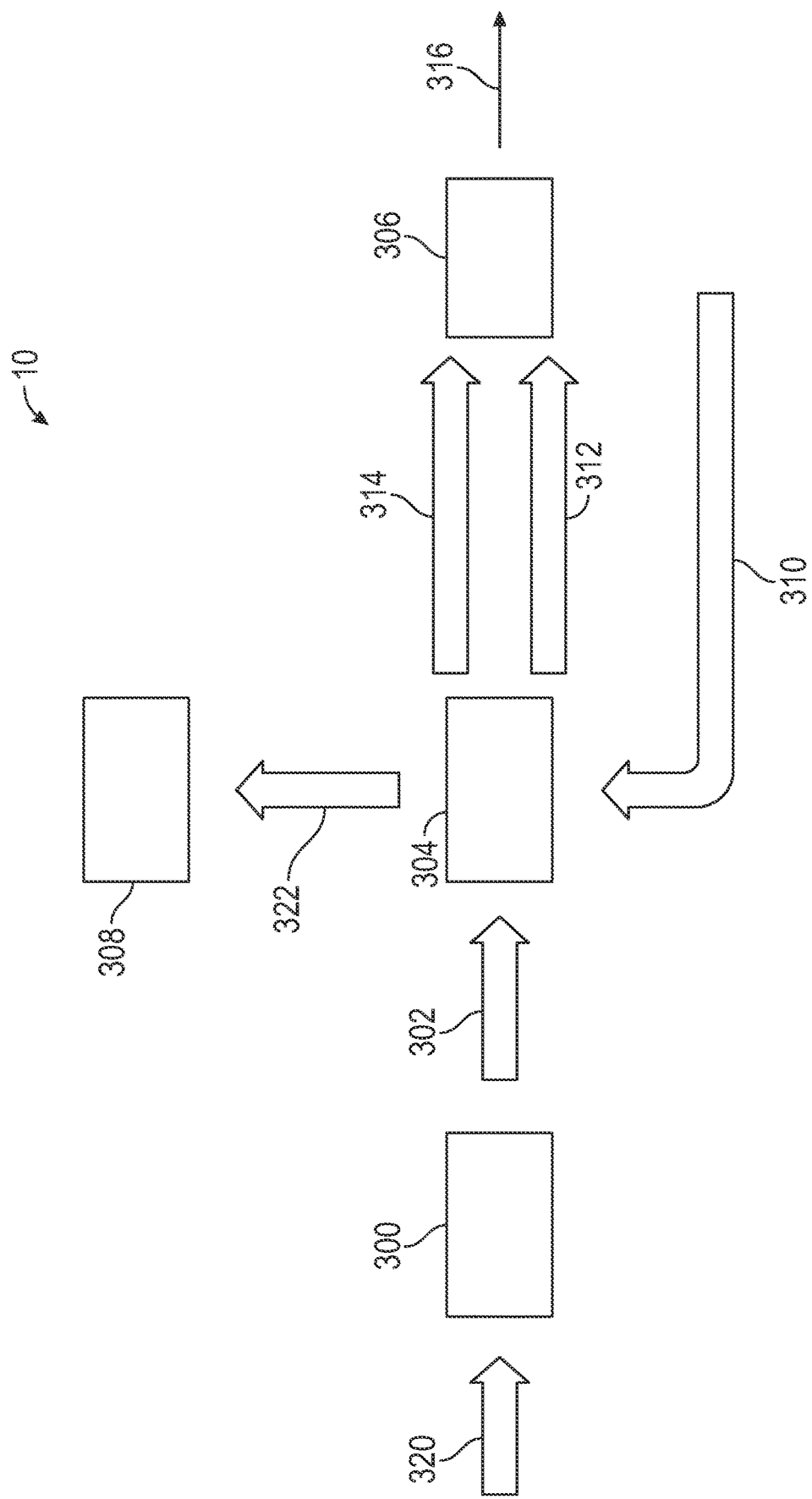
FIG. 3 is a diagram of a vehicle control system, in accordance with various embodiments.
Figure 4:
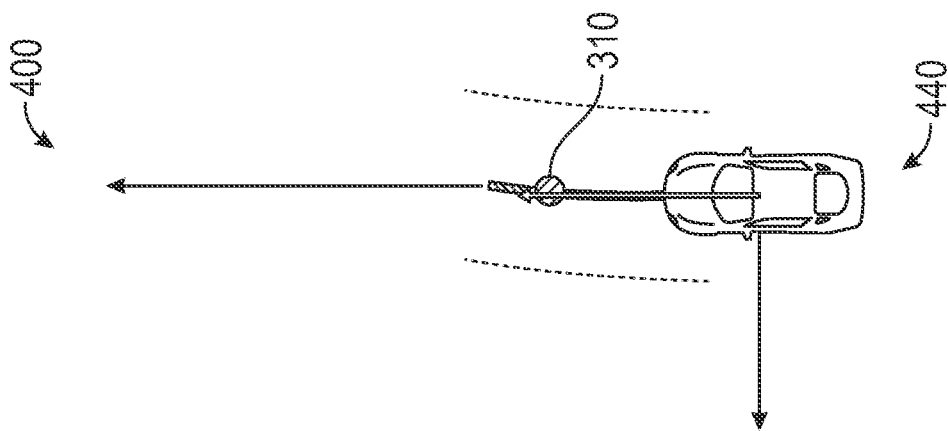
FIG. 4 is a schematic depiction of various modes of vehicle control, in accordance with various embodiments.
Figure 4:
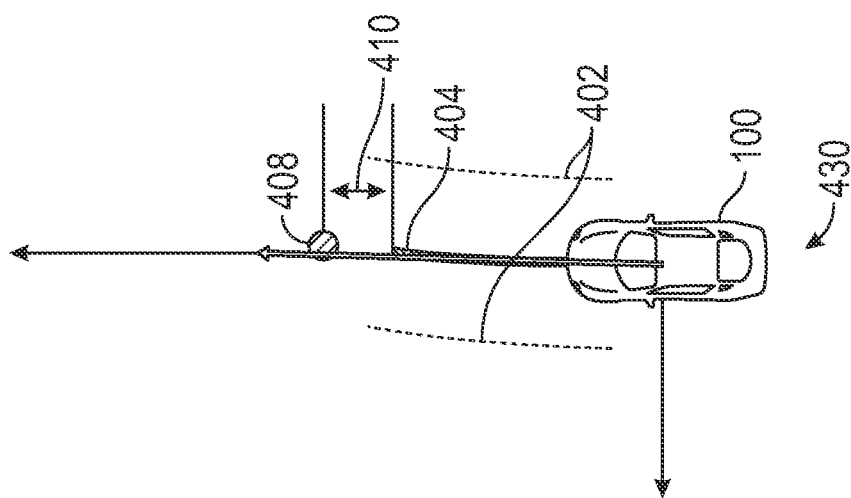
Figure 4:
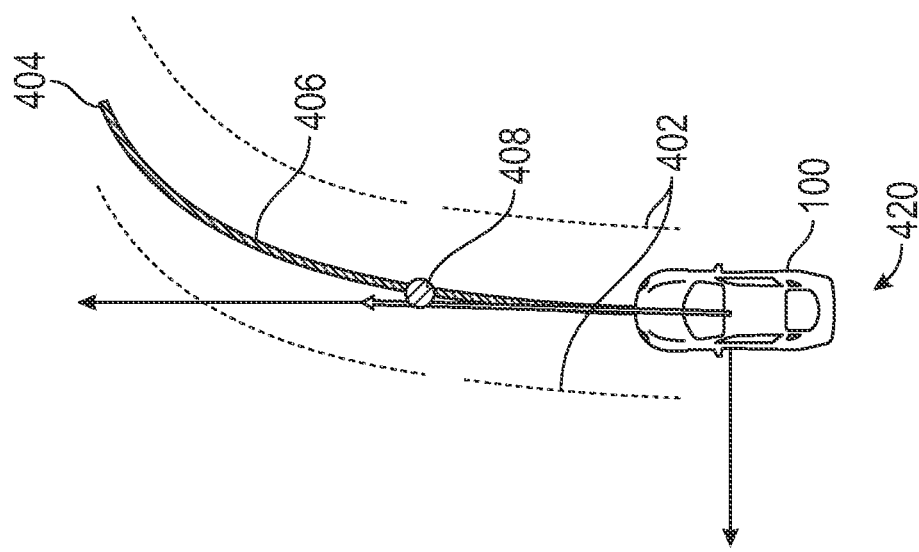
Figure 5:
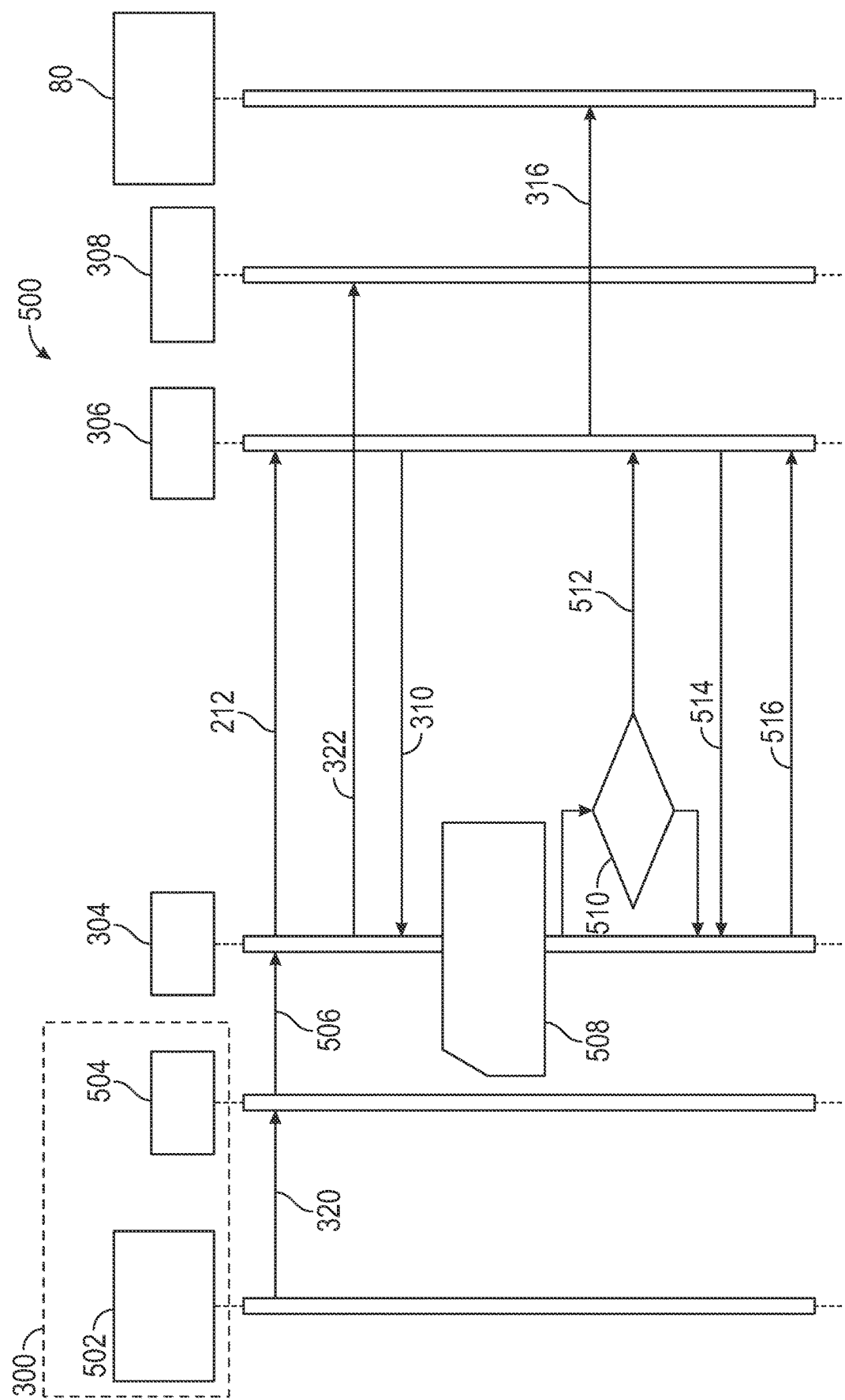
FIG. 5 is a swim lane representation of intra-system communication, in accordance with various embodiments.
Figure 7:
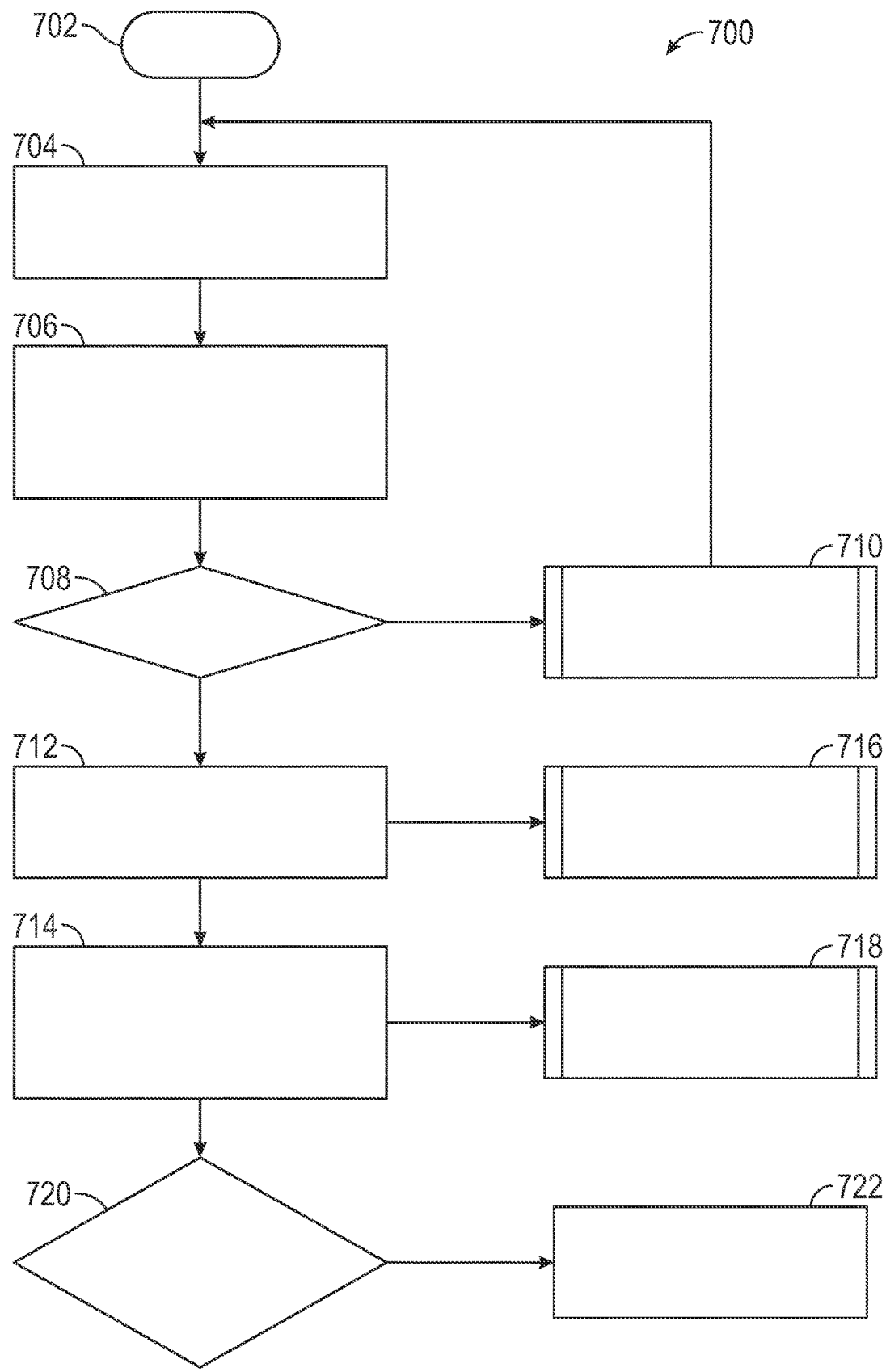
FIG. 7 is a flowchart illustrating a method of controlling a vehicle, in accordance with various embodiments.

In various embodiments, one or more instructions of the controller 1034 are embodied in the vehicle control system 10 and, when executed by the processor 1044, implement the vehicle control system 10 described with respect to FIGS. 3 to 5 and method steps as described with respect to FIG. 7. In particular, the instructions of the controller 1034 detect when a range of the perception system 300 is degraded to a location closer to the vehicle 100 than a LA point set by a lateral controller and brings the LA point at least as close to the vehicle 100 as the range of the perception system. A motion planner and the lateral controller utilizes the foreshortened LA point in motion planning and lateral vehicle control.

Figure 2:
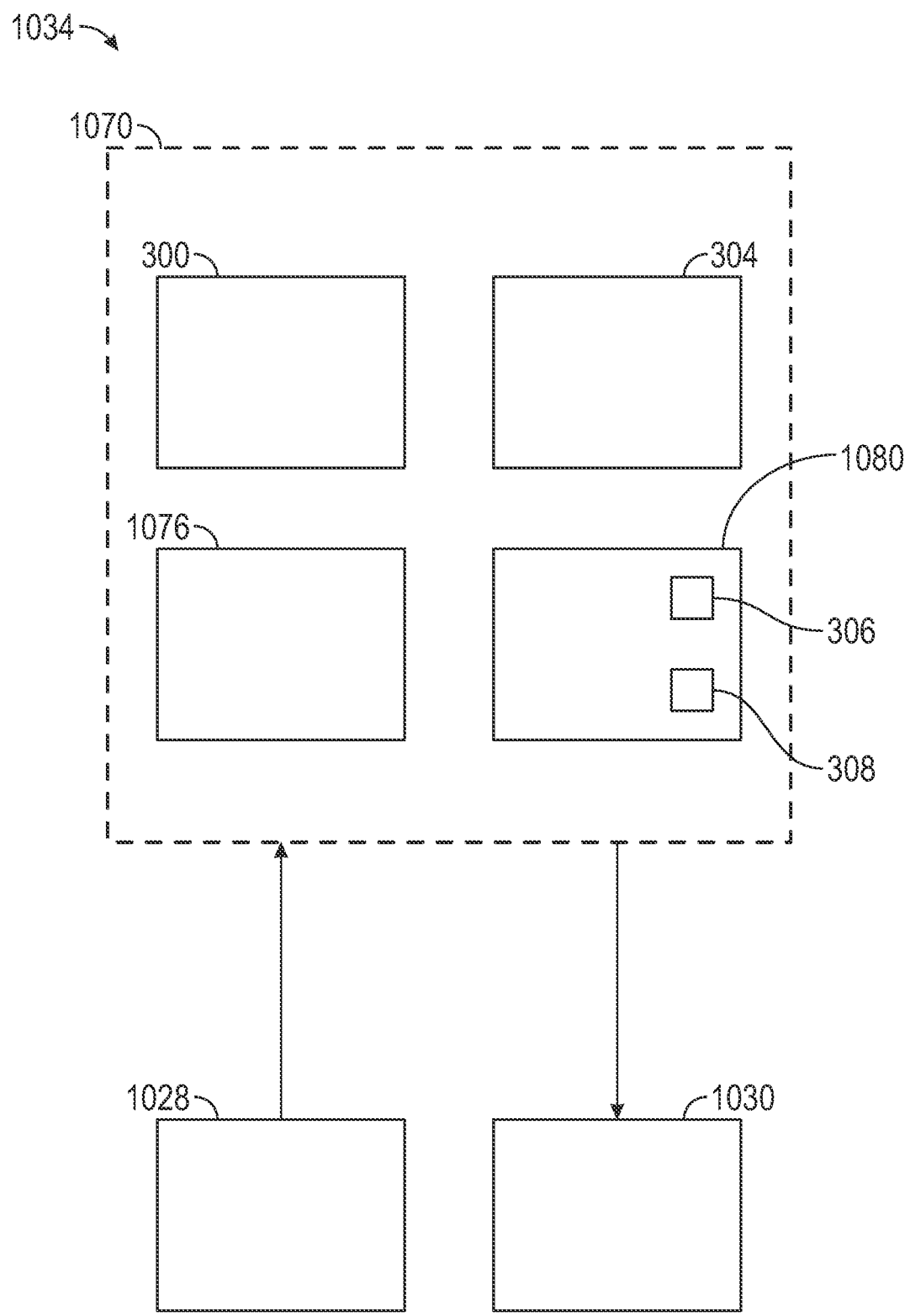
FIG. 2 is a dataflow diagram illustrating an autonomous or semi-autonomous driving system that includes the vehicle control system, in accordance with various embodiments.

In accordance with various embodiments, the controller 1034 implements an Advanced Driver Assistance System (ADAS) 1070 as shown in FIG. 2. That is, suitable software and/or hardware components of controller 1034 (e.g., processor 1044 and computer-readable storage device 1046) are utilized to provide an ADAS 1070 that is used in conjunction with vehicle 100.

In various embodiments, the instructions of the ADAS 1070 may be organized by function or system. For example, as shown in FIG. 2, the ADAS 1070 can include a perception system 300, a positioning system 1076, a motion planner 304, and an actuator controller 1080. As can be appreciated, in various embodiments, the instructions may be organized into any number of systems (e.g., combined, further partitioned, etc.) as the disclosure is not limited to the present examples.

In various embodiments, the perception system 300 synthesizes and processes sensor data and predicts the presence, location, classification, and/or path of objects and features of the environment of the vehicle 100. In various embodiments, the perception system 300 can incorporate, and fuse, information from multiple sensors, including but not limited to cameras 12, lidars 14, radars, and/or any number of other types of sensors. The perception system 300 provides perception data 302 representing a forward scene of the environment including lane markers. The perception system 300 localizes and classifies the lane markers, which may be roadside curbs, painted lane markings, road edges, etc. providing a demarcation of the road or lane. The perception system 300 provides the lane markers in the form of one or more lines and each line is associated with a length corresponding to a range of the lane markers. As such, the perception data 302 from the perception system 300 includes information defining a lane ahead of the vehicle 100 and a range of the lane as perceived relative to the vehicle 10. In good conditions, the range of the lane markers may be 100 meters or more ahead of the vehicle 100 whereas in degraded conditions (e.g. due to road conditions (such as sharp curves and large gradient slopes), environmental conditions (such as rain, snow, fog, etc.) and/or poor lane demarcations (such as faded painted lane markings)) whereas in degraded conditions, the lane markings may be perceived only 30 meters ahead or less.

The positioning system 1076 processes sensor data along with other data to determine a position (e.g., a local position relative to a map, an exact position relative to lane of a road, vehicle heading, velocity, etc.) of the vehicle 100 relative to the environment. The motion planner 304 processes sensor data along with other data to determine a path for the vehicle 100 to follow. The actuator controller 1080 generates control signals for controlling the vehicle 100 according to the determined path. The actuator controller 1080 includes a lateral controller 306 and a longitudinal controller 308, which will be described in further detail below.

In various embodiments, the controller 1034 implements machine learning techniques to assist the functionality of the controller 1034, such as feature detection/classification, obstruction mitigation, route traversal, mapping, sensor integration, ground-truth determination, and the like.

The actuator controller 1080 is configured to communicate a vehicle control output to the actuator system 1030. In an exemplary embodiment, the actuators 1042 include a steering control, a shifter control, a throttle control, and a brake control. The steering control may, for example, control a steering system 1024 as illustrated in FIG. 1, which includes the EPS system 80 (shown in FIG. 5). The shifter control may, for example, control a transmission system 1022 as illustrated in FIG. 1. The throttle control may, for example, control a propulsion system 1020 as illustrated in FIG. 1. The brake control may, for example, control a wheel braking system 1026 as illustrated in FIG. 1.

As mentioned briefly above, the ADAS 1070 is included within the vehicle control system 10. The vehicle control system 10 of various embodiments of the present disclosure provide methods and systems by which the motion planner 304 responds to a degraded viewing range of the perception system 300 relative to a LA point and requests a shortened LA point. The lateral controller 306 changes the LA point to at least bridge a perception gap and provides the adjusted LA point to the motion planner 304. A request to reduce speed of the vehicle 100 is also sent to the longitudinal controller 308. The motion planner 304 adjusts its trajectory determination based on the shorter LA point and the lateral controller 306 determines steering commands for the EPS system 80 based on the adjusted trajectory and shorter LA point.

The vehicle control system 10 of the present disclosure is illustrated in greater detail in FIG. 3, in accordance with an exemplary embodiment. The vehicle control system 10 includes the perception system 300, the motion planner 304, a lateral controller 306 and a longitudinal controller 308. Further, the EPS system 80 and the sensing system 1028 are included in the vehicle control system 10. The vehicle control system 10 may control the steering and velocity of the vehicle 100 as part of various ADASs 1070 including adaptive lane centering, low speed lane centering, collision avoidance, lane keeping assist, parking assist, hands off autonomous driving and full autonomous driving.

The perception system 300 receives raw perception data 320 from cameras, LiDAR and other perception devices (e.g. Radar Devices) attached to or associated with the vehicle 100. The perception system 300 obtains the raw perception data 320 and processes it to determine or measure the relative location of the vehicle 100 with respect to road features, for example, other vehicles, lane markers(s), road shoulder(s), median barrier(s), edge of the road and other objects or features. These road features are localized and classified and output as part of perception data 302. Cameras may, for example, measure distance and/or relative orientation to objects, other vehicles (e.g., vehicles in front of vehicle 100 that may pose a collision threat), lane offset, heading angle, lane curvature and provide the information to the motion planner 304 in the form of perception data 302. The perception data 302 can describe position and other state characteristics (e.g. relative velocity, orientation, state of traffic lights, etc.) of the various detected items in addition to classifying them. Referring to FIG. 4, the perception system 300 classifies and localizes lane markers 402 and a lane center profile 406 as part of the perception data 302. The lane markers 402 may be generated based on painted lane lines, road edges, roadside curbs, and other features demarcating lane boundaries. The lane center profile corresponds to a longitudinal profile of a road or lane, which is disposed centrally between the left and right lane markers 402 and follows a curvilinear profile of the lane markers 402. A perception range end point 404 represents an end of the lane center profile 406 (which may also be referred to as a target path or line) and is defined by a limit (away from the vehicle 10) of the lane markers 402 as perceived by the perception system 300. As the perceptibility conditions degrade, the perception range end point 404 moves closer to the vehicle 100 because the lane markers 402 are only able to be identified and localized by the perception system 300 at a maximum distance away from the vehicle 100 that is closer to the vehicle 100 than under normal perception conditions.

The perception system 300 provides perception data 302 to the motion planner 304. The perception data 302 may be generated based on data from the sensing system 1028, as described above, including one or more cameras, a global positioning system (GPS) receiver, a lidar, an inertial measurement unit included in the vehicle dynamics sensors 86 and vehicle Controller Area Network (CAN) data. The motion planner 304 may further receive localization and mapping data from the positioning system 1076 (which utilizes map data 24 from the map 16). The positioning system 1076 provides a navigation function for planning a route relative to a map from a start location to a destination location in some applications of the vehicle control system 10. The positioning system 1076 is able to locate the vehicle 100 relative to the route and the map. This localization and mapping data may provide a base route by which the motion planner 304 generates more detailed instructions for autonomous driving. In particular, the motion planner 304 further takes into account the perceived environment based on the perception data 302 such as traffic signs, obstacles, traffic, the lane markers 402 etc. The motion planner 304 outputs a commanded trajectory 314 based at least on the perception data 302.

The motion planner 304 plans a trajectory for the vehicle 100 taking into account the perception data 302, optionally map data and state data concerning the vehicle 100 (which may include vehicle dynamics data from the vehicle dynamics sensors 86) to plan a path for the vehicle to avoid obstacles, stay centrally located in a lane, to navigate to a destination, etc. depending on the application. The motion planner 304 provides a commanded trajectory 314 including, in some embodiments, at least position data and heading (or yaw) data for each time spaced data point. The vehicle control system 10 selects and outputs a set of actuator commands (including a steering command in the form of an EPS system command 316) that simultaneously minimizes departure of the predicted position from the planned position and departure of the predicted heading from the planned heading, among other terms to be minimized to optimally control a lateral position of the vehicle 100.

An exemplary commanded trajectory 314 includes a series of waypoints making up the commanded trajectory 314. Each waypoint includes a vector of data including, for example, position data x, y (in an x (lateral) direction and a perpendicular y (longitudinal) direction), heading $\psi$, yaw rate, $\dot{\psi}$ (which is a time derivative of heading), velocity $v_x$, $v_y$ (in the x and y directions) and acceleration $a_x$, $a_y$ (in the x and y directions). Each waypoint can be designated as an ith waypoint in the series. The commanded trajectory 314 thus provides a desired path for the vehicle 100 to follow. In other embodiments, the commanded trajectory is present as a polynomial. In the case of a polynomial representation, the lateral controller 306 extracts the position data (x,y coordinates), the heading and the curvature from the polynomial.

The actuator controller 1080 (including the lateral controller 306 and the longitudinal controller 308) is configured to receive the commanded trajectory 314, to process the commanded trajectory 314 and to output actuator commands including the EPS system command 316. The actuator controller 1080 aims to generate a steering command in the form of the EPS system command 316 to follow the commanded trajectory 314 as closely as possible whilst also taking into account other factors such as lateral stability, passenger comfort and actuator constraints. As such, the EPS system command 316 may not necessarily result in the vehicle 100 precisely following the requested path defined by the commanded trajectory 314.

The actuator controller 1080 includes a lateral controller 306, as shown in FIG. 3. The lateral controller 306 includes position control and curvature control algorithms. The position control algorithm generates a commanded vehicle path curvature based on a desired position of the vehicle 100 at a Look Ahead (LA) distance (point) ahead of the vehicle 100 and associated desired heading angle at the LA distance and desired curvature at the LA distance, which are provided by the motion planner 304 as part of the commanded trajectory 314. The position control algorithm processes this information to determine a commanded path curvature. The commanded path curvature may be limited based on lateral acceleration limits. The curvature control algorithm determines a curvature error based on actual state of the vehicle and feeds this back in determining a target road wheel angle (RWA) that may also factor in bank angle compensation. The algorithms of the lateral controller 306 determine a target RWA using feedforward and feedback control loops that are derived from one or more vehicle dynamics models such as the dynamic bicycle model. The target RWA is provided to a steering angle controller of the lateral controller, which performs a steering angle to steering torque conversion operation as a function of a difference between the target RWA and a measured RWA from the vehicle dynamics sensors 86 to generate the EPS system command 316. In addition to the measured RWA, further data may be fed back for use in the one or more feedback control loops of the lateral controller such as measured path curvature and measured heading angle so that the lateral controller 306 factors in path curvature error and heading angle error in determining the EPS system command 316.

The EPS system command 316 may be steering torque in the present embodiment. However, other lateral controllers 306 than the exemplary embodiment of FIG. 3 may generate the EPS system command 316 in the form of a steering angle or RWA command. The steering angle controller may include feedforward and feedback control loops, with the functions defined thereby being constructed based on one or more vehicle dynamics models.

In other embodiments, the actuator controller 1080 utilizes a Model Predictive Control (MPC) algorithm, which includes a plurality of terms representing factors that should be minimized when generating the EPS system command 316 such as a heading term and a trajectory term. The heading term represents a difference between the planned heading (as provided by the motion planner 304) and current and predicted heading of the vehicle 100. The trajectory term represents a difference between the planned position (as provided by the motion planner 304) and the current and predicted position of the vehicle 100. The actuator controller 1080 may minimize an aggregate sum of each of the terms (and further terms) over a finite number of time spaced iterations and selects the set of output commands associated with the minimum, which include the EPS system command 316. The MPC algorithm may obtain actuators commands by repeatedly solving an open loop finite-horizon optimal control problem. The MPC algorithm allows for real-time optimization of a given performance index while taking into account a vehicle motion model and constraints on actuators and outputs. The performance index may embody at least a differential between planned and current/predicted heading and differential between planned and current/predicted vehicle position. The vehicle position, heading and other vehicle outputs are predicted using a vehicle motion model that may be a simplified vehicle dynamics model. Any suitable vehicle motion model that is capable of predicting at least vehicle heading and vehicle position from a set of actuator commands may be used. The vehicle model may be a set of non-linear standard deferential equations or any other form, for example an RL-Model. The vehicle motion model may also predict velocity and yaw rate. The MPC algorithm applies constraints on the actuator commands to reflect physical limits of the actuator system 1030 and the planned trajectory. For example, there may be a maximum deviation from the planned trajectory as one constraint, maximum and minimum values for various actuators of the actuator system 1030, maximum rates of change for the actuators, impermissible locations for the vehicle 100 (such as overlap with a perceived obstacle), maximum and/or minimum values for outputs of the vehicle (such as speed), etc.

Continuing to refer to the exemplary embodiment of FIG. 3, and with additional reference to FIG. 4, the motion planner 304 receives the perception range end point 404 (or perception range along the lane center profile 406/target line) from the perception system 300 and a current LA point 408 from the lateral controller 306. The motion planner 304 compares the current LA point 408 and the perception range end point 404 to determine which is closer to the vehicle 100 along the lane center profile 406. If there is a perception gap 410, which occurs in degraded perception conditions, then the motion planner sends a request for reduced LA point 312 to the lateral controller 306. The request for reduced LA point 312 includes a length of the lane center profile from the vehicle 100 to the perception range end point 404. At the same time, the motion planner 304 sends a velocity reduction command 322 to the longitudinal controller 308. The longitudinal controller 308 responds by reducing a longitudinal speed of the vehicle 100. The lateral controller 306 responds to the request for reduced LA point 312 by determining a reduced LA point 310 to send back to the motion planner 304. The reduced LA point 312 is determined to be closer to the vehicle 100 than the perception range end point 404 where this is possible (and as described further below). The lateral controller determines the EPS system command 316 based on a tracking error between the commanded trajectory 314 and an actual trajectory 610 (which is described with respect to FIG. 6) at the reduced LA point 310. The motion planner 304 determines the commanded trajectory 314 in a next time step using the reduced LA point 310 (e.g. by blending curves at the reduced LA point).

Figure 6:
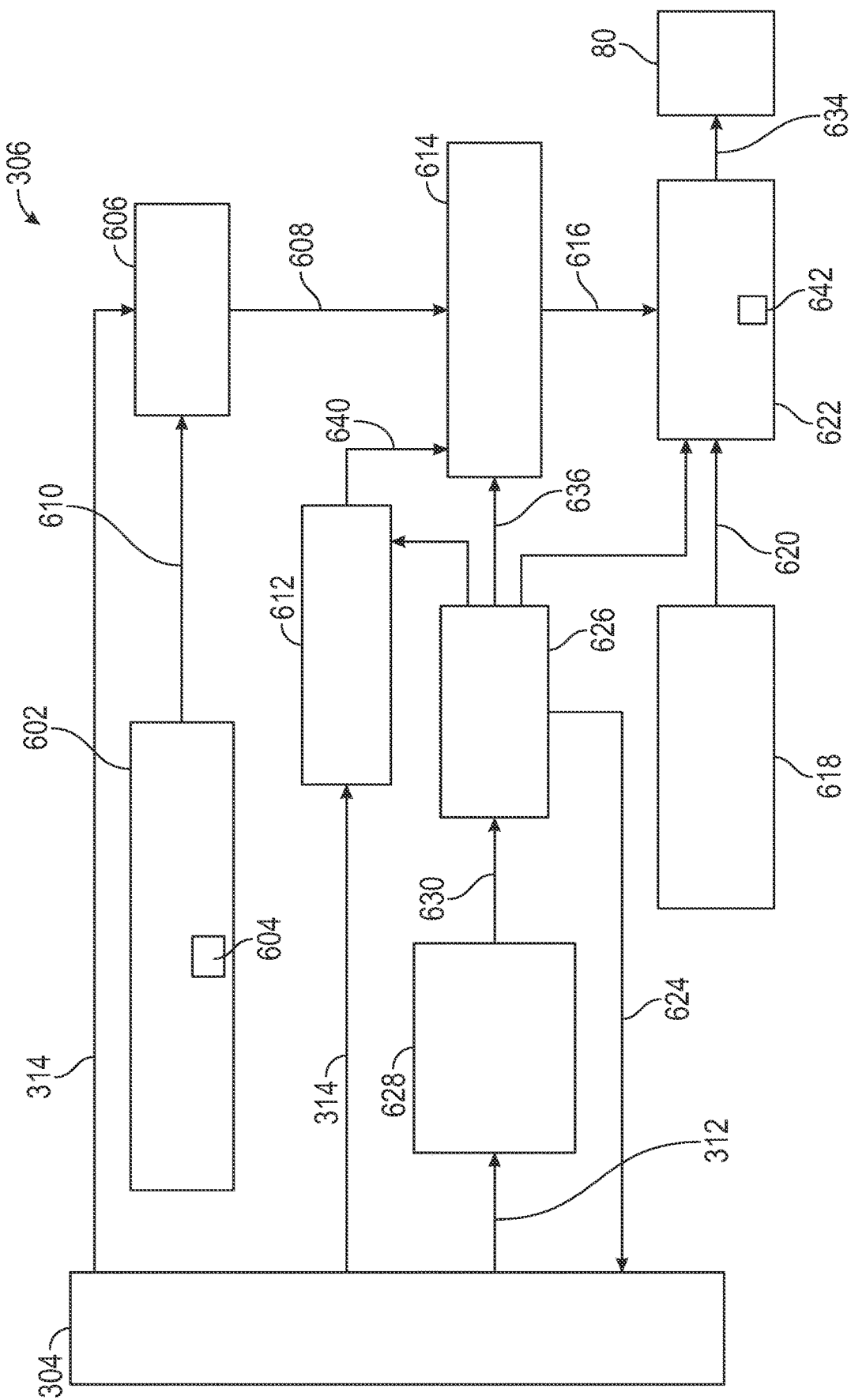
FIG. 6 is a more detailed view of a lateral controller, in accordance with various embodiments.

An exemplary embodiment of the lateral controller 306 is depicted in a block diagram in FIG. 6. The lateral controller 306 receives a commanded trajectory 314 from a motion planner 304, minimizes a tracking error 608 between an actual trajectory 610 and the command trajectory 314 at a LA point 408 (see FIG. 4) and provides the EPS system command 316 based thereon, which may be in the form of a steering angle command 634. The lateral controller includes a plant dynamics module 602, a tracking error module 606, desired states at LA module 612, an available LA time module 628, a control LA time module 626, an error at LA module 614, a control gain computation module 618 and a control command module 622.

The plant dynamics module 602 receives a variety of values from the vehicle dynamics sensors 86 (or derived from these values) including lateral velocity, longitudinal velocity, heading angle, steering angle and yaw rate. The plant dynamics module 602 populates a vehicle dynamics model 604 using values from the vehicle dynamics sensors 86 and predicts a state of the vehicle 100 at a next time step. The predicted state of the vehicle 100 at the next time step is output by the plant dynamics module 602 as the actual trajectory 610. The actual trajectory 610 includes a prediction for lateral position, lateral velocity, heading angle and yaw rate of the vehicle 100. The vehicle dynamics model 604 may be a vehicle dynamics model as described in the foregoing.

The tracking error module 606 determines a discrepancy between the actual trajectory 610 and corresponding values for a desired lateral position, lateral velocity, heading angle and yaw rate provided in the commanded trajectory. The tracking error 608 module 606 thus outputs a tracking error 608 or a trajectory of the vehicle between the commanded or desired trajectory and the predicted or actual trajectory. The tracking error 608 (which may be in the form of a tracking error trajectory with a series of time spaced values) is assessed by the error at LA module 614 to ascertain an error at a LA distance or point. The error at LA distance is derived from an LA time 636 that is determined by the control LA time module 626 and the available LA time module 628.

The available LA time module 628, determines an available LA time 630 based on a perception range provided by the motion planner 304 as part of the request for reduced LA point 312. The perception range is a distance along the lane center profile 406 (see FIG. 4) from a center point of the vehicle 100 to the perception range end point 404. The available LA time module 628 determines the available LA time 630 according to the following relation:

$$\begin{cases} t_{TL} = \begin{cases} 0 & \dfrac{L_{TL}}{V_x} < t_{min} \\ t_{TLmax} & \text{when } \dfrac{L_{TL}}{V_x} > t_{max} \\ \dfrac{L_{TL}}{V_x} & \text{Otherwise} \end{cases} \end{cases} \quad \text{(equation 1)}$$

In equation 1:

$t_{TL}$: available LA time 630 based on the length (range) of a target line (or lane center profile 406) that the motion planner 304 provides to the lateral controller 306.

$L_{TL}$: Length of the target line that the motion planner 304 provides. This corresponds to the above described perception range.

$V_x$: Longitudinal velocity of the vehicle.

$t_{min}$: minimum LA time necessary for the lateral controller 306. If $L_{TL}/V_x$ is less than this number, the lateral controller 306 cannot successfully laterally control the vehicle and sets the available look-ahead time to 0. $t_{min}$ may be a speed dependent predetermined look-up value.

$t_{max}$: maximum LA time required by the lateral controller 306. If length of the target line (in units of time at current vehicle speed) from the motion planner 304 is larger than maximum LA time, the available LA time 630 is set to the maximum LA time. $t_{max}$ may be a speed dependent predetermined lo-up value.

The available LA time 630 determined by the available LA time module 628 is provided to the control LA time module 626, The control LA time module 626 adapts the available LA time 630 based on at least vehicle longitudinal speed and optional also curvature of the path planned or experienced by the vehicle 100. The control LA time module 626 utilizes the following relation:

$$t_{LA} = G_{LA} t_{TL} \quad \text{(equation 2)}$$

In equation 2:

$G_{LA}$: is a gain multiplier in the lateral controller 306, as a function of speed and curvature, for the look-ahead time. The gain multiplier may be stored in a two-dimensional loop-up table in memory 1046 (FIG. 1). For example, if the available look-ahead time 630 is 2 seconds, the lateral controller 306 may set $G_{LA}$=0.5 and modify an LA time 636 to 1 sec.

$t_{LA}$: is a final LA time 636 that is used in subsequent control functions for determining the error at the LA point 408 corresponding to the LA time 636.

Continuing to refer to FIG. 6, the LA time 636 is provided to the error at LA module 614 to determine the error at LA 616 at the LA time 636 using the tracking error 608. The error at LA module 614 converts the LA time 636 from the time domain to distance domain based on speed of the vehicle 100. In particular, the desired states at LA module 612 ascertains a desired heading at the LA time 636 and a desired lateral position at the LA time 636 based on values for road states, values for the current vehicle heading and the current vehicle lateral position and multiplying the LA time 636 by the longitudinal speed of the vehicle. The error at LA module 614 resolves the tracking error 608 at the LA point 408 using the desired states at LA 640, which is converted from the LA time 636 using vehicle speed. The error at LA 616 is output by the error at LA module 614 and sent to the control command module 622.

The control command module receives gains 620 from a control gain computation module 618. The various gains 620 used by the algorithms of the lateral controller 306 may be determined in dependence on vehicle velocity and/or desired path curvature. As such, a two-dimensional look-up table may be stored in memory 1046 that relates controller gain values to vehicle velocity and desired path curvature. A mathematical function equivalent of the look-up table relationship may also be provided.

The control command module 622 may include a steering command generation function 642. The steering command generation function 642 may determine a steering angle command 634. The steering angle command 634 may be determined by way of a first feedback function f, which is a function of the error at LA 616 (and rate of change thereof), vehicle parameters, vehicle and road states x and rate of vehicle and road states. The feedback loop aims to minimize the error at LA 616 (which includes lateral position, lateral velocity, heading and yaw rate error at the LA point 408). The steering angle command 634 may be additionally determined by way of a first feedforward function included in the steering command generation function 642, which may be a function of rate of steering angle command 634, steering angle command 634, vehicle parameters P and vehicle and road states x.

In some embodiments, the steering angle command 634 is used by the EPS system 80 as a target for steering the vehicle 100. In other embodiments, the steering angle command is converted to a torque command. The EPS system 80 outputs a motor torque to a vehicle plant (not shown) based on the EPS system command 316 (including the steering angle command 634). The motor torque boosts or wholly controls an electric power steering motor that actuates steering of wheels 1016 and/or 1018 of the vehicle 100.

Referring to FIG. 4, an exemplary use 400 of the vehicle control system 10 described with respect to FIGS. 3 and 6 is illustrated. In FIG. 4, normal operation (which may be referred to as a first mode) of the vehicle control system 10 is executed when the lane center profile 406 provided by the perception system 300 has a perception range end point 404 (which corresponds to a limit of the perception range of the perception system 300) that is further away from the vehicle 100 than the LA point 408 used by the lateral controller 306. As described above, the LA point 408 corresponds to the LA time 636 converted into distance based on the current vehicle speed. In normal operation, the perception range is sufficient to allow a trajectory to be constructed by the motion planner 304 that passes through the LA point 408 and which is within the perception range defined by the perception range end point 404. In FIG. 4, a degraded perception operation 430 of the vehicle control system 10 is also illustrated (which may be referred to as a second mode of operation). In the degraded perception operation 430, the lane information (described by the lane markers 402) provided by the perception system 300 is degraded such that the perception range end point 404 is closer to the vehicle 100 than the LA point 408 resulting in a perception gap 410. That is, the visible length of the lane markers 402 has dropped below the LA point 408 relative to the vehicle such that the perception system 300 is reporting a lane center profile 406 that has a reduced range relative to the vehicle 100 than the LA point 408. Since the motion planner 304 generates the commanded trajectory 314 no further than a limit of the perception range of the perception system and requires the LA point 408 as part of its motion planning algorithm, an optimal commanded trajectory 314 cannot be generated. That is, motion planner 304 requires the commanded trajectory 314 to pass through the LA point 408 (where adjacent curves are blended as part of the trajectory planning process) and also for the commanded trajectory 314 to not extend further than the perception range.

Continuing to refer to FIG. 4, when there is a perception gap 410 determined by the motion planner 304, the motion planner 304 sends a request to the lateral controller 306 for a reduced LA point 310. The request includes information on the perception range (e.g. coordinates of the perception range end point 404 or a distance along the lane center profile 406 to the perception range end point 404 relative to the vehicle 100). The perception range is converted to an available LA time 630 using vehicle speed by the lateral controller 306. When the available LA time 630 is less than a predetermined minimum value, the LA time 636 (and thus the reduced LA point 310) is set to a minimum value. When the available LA time 630 is between a predetermined minimum and a predetermined maximum, the available LA time 630 is further processed by multiplying by an LA gain that is dependent at least on speed and curvature. This sets an LA time 636 that can be converted back to a distance based on vehicle speed to provide the reduced LA point 310. The lateral controller 306 determines the EPS system command 316 based on the error between the commanded trajectory 314 and the actual trajectory 610 at the reduced LA point 310. The reduced LA point 310 provided from the lateral controller 306 to the motion planner 304 eliminates the perception gap since it has moved closer to the vehicle 100 and is within the perception range, as illustrated by the reduced LA point operation 440 in FIG. 4. The motion planner 304 generates the commanded trajectory 314 using the reduced LA point 310. The motion planner 304 additionally requests the longitudinal controller 308 to reduce speed according to a velocity reduction command 322. Since the velocity is reduced and the LA point 310 is reduced, a next time step of use 400 of the vehicle control system 10 may allow the degraded perception operation 430 to be exited as the perception range extends further than the reduced LA point 310.

In embodiments, the longitudinal controller 308 can respond to the velocity reduction command 322 in a number of possible ways. The velocity reduction command 322 can be determined by the motion planner 304 so as to factor in the perception range and the LA time 624 that would have been determined by the lateral controller 306 under normal perception conditions (e.g. the last value for the LA time 624 prior to switching to the degraded perception operation 430), which can be combined to a commanded longitudinal speed (by dividing the perception range by the LA time 624). The velocity reduction command 322 will cause the longitudinal controller 308 to reduce the speed of the vehicle 100 to the commanded longitudinal speed at an allowable velocity reduction rate. The commanded longitudinal speed may be reduced further by a small buffer margin so that the vehicle 100 does not have a LA point that is operating directly at the edge of the perception range.

In the exemplary embodiment of FIG. 5, a swimlane representation 500 of intra-system (the vehicle control system 10) communication is illustrated. The perception system 300 includes a perception data capture device 502 providing the raw perception data 320 and scene provider 504 that is part of computer processing operation of the perception system 300. The scene provider 504 processes the raw perception data 320 to locate and classify the external scene and to identify lane markers 402 and the lane center profile 406. The lane center profile 406 may have a relatively short length relative to the vehicle 100, which can be identified as degraded lane information 506. The degraded lane information is provided to the motion planner 304, which recognizes it as such by comparing the perception range to a current LA point 408.

The motion planner 304 may determine that the perception range is further away from the vehicle 100 than a current LA point 408 provided by the lateral controller 306. In that case, the normal operation 420 is executed whereby the motion planner 304 uses the LA point in determining the commanded trajectory 314. In the event that the motion planner 304 determines that the perception range is insufficient in that the current LA point is further from the vehicle 100 than the perception range end point 404, then the vehicle control system 10 runs the degraded perception operation 430. In the degraded perception operation 430, the motion planner 304 sends the request for reduced LA point 212 to the lateral controller 306 and sends the velocity reduction command 322. The longitudinal controller 308 responds to the velocity reduction command by reducing the speed of the vehicle 100. The lateral controller 306 determines an available LA time 630 using the perception range included in the request for reduced LA point 212 and the longitudinal speed of the vehicle 100. The available LA time 630 is multiplied by the speed and curvature dependent gain to determine the LA time 636, which can be converted back to a distance based on the current speed of the vehicle 100. The lateral controller 306 uses the reduced LA point 310/LA time 636 in determining the EPS system command 316 based on the error between the commanded trajectory 314 and the and the actual trajectory 610 at the reduced LA point 310. It may be that the speed and curvature of the vehicle 100 is such that that the gain increases the LA point as compared to the requested distance, which corresponds to the perception range. It is for this reason that the motion planner 304 determines whether the reduced LA point 310 is feasible at 510. That is, the motion planner 304 attempts to calculate a trajectory per the reduced LA point 310 at step 508. The motion planner 304 may not be able to successfully determine such a trajectory in view of the perception range falling short of the reduced LA point 310. In that case, step 510 determines a lack of feasibility and issues a further request for reduced LA point 512 to the lateral controller 306. The lateral controller 306 determines a further modified LA point 514. The further modified LA point 514 can be different from the reduced LA point 310 because the speed of the vehicle 100 has been reduced in response to the velocity reduction command 322 (which will impact the gain multiplier), the perception range included in the further request for modified LA point 512 may have change (because of changing environmental conditions) and the road curvature may have changed. The lateral controller 306 thus determines a further modified LA point 514 and uses the further modified LA point 514 in determining a modified trajectory 516. The lateral controller 306 takes the modified trajectory as a new commanded trajectory 314 and incorporates that in determining the EPS system command 316 as described previously.

An exemplary use case for the vehicle control system 10 will be described. In the degraded perception operation 430, the reduced LA point 310 is determined by the lateral controller so as to be within the trajectory length (or perception range) provided by the motion planner 304. The trajectory length can be reliably calculated based on the view range of the perception system 300 since LA point reduction can occur instantly. In one example (where the various values are purely for explanation and non-limiting), assuming normal operation 420, and given current curvature and speed, the LA point 408 is 45 meters away from the vehicle 100. If the view range of the perception system 300 is reduced such that there is only 38 m of view range, then the motion planner 304 enters degraded perception operation 430 and requests a reduced LA point of 38 meters or (slightly less such as 36 m where a safety buffer is included). The lateral controller 306 determines the EPS system command 316 based on that reduced LA point 310, which may lead to less than optimal control performance because, in this example, the vehicle 100 is still traveling at velocity where the LA point would ideally be 45 m away from the vehicle. However, since the vehicle is starting to slow at the same time in response to the velocity reduction command 322, the degraded lateral control operation will gradually improve as the vehicle velocity is reduced. Quantifying control performance in terms of percentages, the following exemplary table illustrates a time progression in iteration steps of the vehicle control system 10 with respect to Field Of View (FOV) provided by the perception system 300, the look ahead distance requested by the motion planner, mode of operation and optimality of lateral control as a percentage under the assumption that the FOV does not self-improve from the illustrative 38 m.

TABLE 1

| Time | T0 | T1 | T2 | T3 | T4 | T5 |
|---|---|---|---|---|---|---|
| FOV (m) | 80 | 38 | 38 | 38 | 38 | 38 |
| LA distance (m) | 45 | 36 | 36 | 36 | 36 | 36 |
| Vehicle Velocity (m/s) | 33 | 33 | 28 | 24 | 22 | 21 |
| Optimal control (%) | 100 | 75 | 77 | 82 | 90 | 99 |
| Operation mode | Normal | Degraded | Degraded | Degraded | Degraded | Normal |

In the example of Table 1, the degraded mode of operation has been exited because the reduced vehicle velocity is such that the reduced LA point 310 provided by the lateral controller 306, which is speed dependent, has moved below the requested 36 meters. That is, the lateral controller 306 has returned to optimal level of operation because velocity reduction turns an unacceptably short LA distance into an acceptable distance as the reduced LA point 310 falls within the LA distance required by the lateral controller 306 under normal operation. In another scenario, if the FOV in Table 1 is decreasing, then the vehicle control system 10 further reduces the vehicle velocity and brings the LA point closer. If the FOV recovers, then the velocity reduction can be halted and LA point can be brought back to the optimal point for the lateral controller 306 according to normal operation.

In general, the degraded perception operation 430 can be exited in a number of ways:

the perception range (sensor FOV) recovers allowing the motion planner 304 to construct a trajectory which meets requirements of the lateral controller 306 for length;

a human driver of the vehicle 100 takes over control of the vehicle 100, which can occur based on a request from the vehicle control system 10; and the perception range (sensor FOV) is still degraded but the vehicle velocity has been reduced to a point where a short trajectory provided by the motion planner (which was unacceptable at original velocity) is no longer an issue (at new reduced velocity).

The position of the LA point provided by the lateral controller 306 is a function of velocity and velocity reduction will ultimately lead to a length of trajectory that is constructed by the motion planner (which is limited by perception range of the perception system 300) exceeding the LA point. Since the LA point is a function of current operating conditions, the velocity is reduced until the lateral controller 306 maintain a desired optimal LA point and still has the LA point within the trajectory length constructed by the motion planner 304.

The exemplary embodiment of the vehicle control system 10 of FIG. 3 is included in the ADAS 1070. In some embodiments, the ADAS 1070 is configured to execute steering and speed control maneuvers, amongst other possible autonomous driving possibilities, to stay centered in a lane based in part on the EPS system command 316. The ADAS 1070 operates known autonomous vehicle control computer instructions through a processor based in part on the EPS system command 316, as described above with respect to FIG. 2.

FIG. 7 shows a flow chart describing exemplary method aspects of the present disclosure for controlling the vehicle 100. The steps of the flow chart of FIG. 7 can be implemented by computer program instructions stored on a computer readable medium executed by a processor such as the at least one processor 1044. The steps may be carried out by the modules, systems and controllers described with respect to FIGS. 3 to 5, for example, and may also take in further aspects of the ADAS 1070 described with respect to FIG. 2.

The flow chart describes an exemplary method 700 for controlling motion of the vehicle 100. The method 700 describes steps to, when a degraded perception condition is detected, reduce velocity of the vehicle 100 and to switch to a lateral control mode whereby the LA point 408 is moved closer to the vehicle 100 than under a normal operation mode of operation. Method 700 starts at step 702 and may run continuously or upon early detection of a falling perception range or some other commencement criteria.

Steps 704, 706 and 708 provide details of the general step of determining whether the perception range of the perception system 300 is greater than (extend further from the vehicle 100 than) the LA point 408 received from the lateral controller 306. In an exemplary embodiment, the LA point 408 is received from the lateral controller 306 at step 704. The LA point 408 is a nominal LA point 408 that is determined by the lateral controller 306 assuming normal perception conditions and based on speed and curvature of a planned path of the vehicle 100. In step 706, a maximum LA point is determined, which is the greater of: (1) the perception range provided by the perception system 300 (e.g. as represented by the perception range end point 404) minus a velocity dependent buffer) and (2) a minimum velocity based length. The velocity dependent buffer may be predetermined as may the minimum velocity based length and can be varied based on operational testing and a particular system configuration. In step 708, it is determined whether the LA point 408 from step 704 is less than (closer to the vehicle 100 along the lane center profile 406) the maximum LA point. If yes (i.e. the perception range exceeds the LA distance), the normal operation 420 proceeds. In the normal operation, the motion planner 304 determines the commanded trajectory 314 using the LA point 408 by blending curves at that point (at step 710). The lateral controller 306 determines the EPS system command 316 by assessing the tracking error between the actual path determined by the lateral controller 306 and the commanded trajectory at the LA point 408.

If step 708 returns a no (i.e. the perception range falls short of the LA point 408), then the vehicle control system 10 switches to the degraded perception operation 430. Under the degraded perception operation 430, the motion planner 304 sends the request for reduced LA point 212 to the lateral controller 306. The motion planner 304 includes the maximum LA point from step 706 in the request. The lateral controller 306 converts the maximum LA point to the available look ahead time 630 based on vehicle speed as has been described with reference to FIG. 6. After gain adjustment, the LA time 636 is converted back into the reduced LA point 310 and sent back to the motion planner 304. The motion planner 304 sets the reduced LA point 310 in step 712 and uses it to determine the commanded trajectory 314 in step 716. The commanded trajectory 314 so determined is sent to the lateral controller 306 for use in determining the EPS system command 316 based on path tracking error at the reduced LA point 310 as described previously herein.

At step 714, the velocity reduction command 322 is determined. In one embodiment, the desired velocity is set at step 714 as the greater of: (1) the perception range divided by the LA time 636 (under normal operation 420) and (2) the current speed of the vehicle 100 minus a maximum allowed step down of speed (per acceleration constraints). The speed set under step 714 is sent to the longitudinal controller 308 as part of the velocity reduction command to perform speed control in step 718.

Whilst the subject matter described herein allows lateral control of the vehicle to be adjusted to a reduced LA point in degraded perception conditions, which can reduce likelihood and frequency of human driver intervention requests, a human driver may still be needed under certain scenarios. One such scenario is described in steps 720 and 722. If the desired velocity determined in step 714 brings the speed too low compared with a threshold, then human driver intervention is requested (e.g. through visual and/or audible alerts through a driver machine interface). In step 720, a difference between current speed and the desired speed from step 714 is computed and compared with a predetermined threshold. If lower, then the driver intervention request is initiated. If higher, then the velocity reduction command 322 is sent to the longitudinal controller 308.

Figure 8:
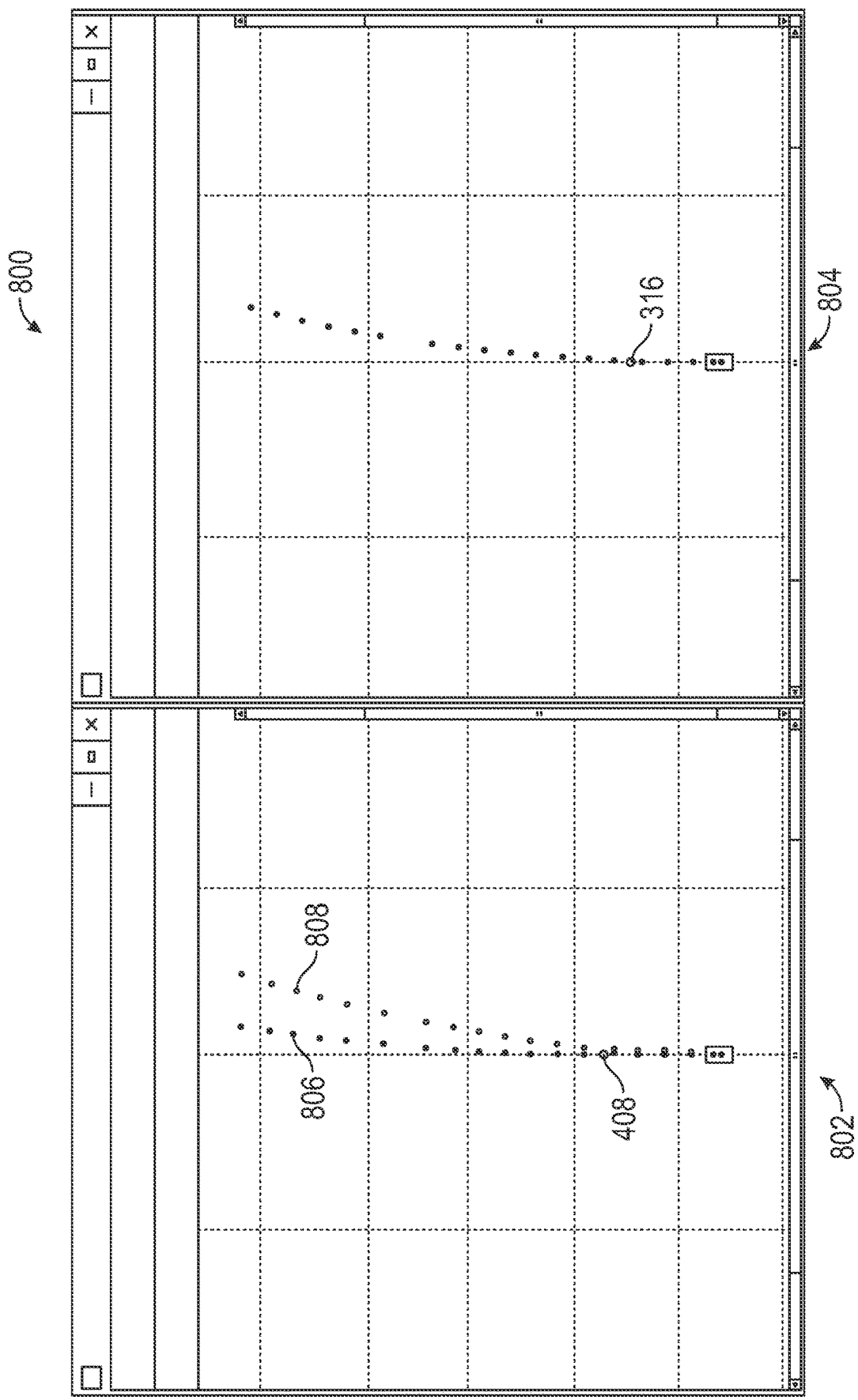
FIG. 8 is a comparison of system performance 800, in accordance with various embodiments.

FIG. 8 illustrates a comparison of system performance 800 under maintained normal operation (per illustration 802) even when perception is degraded and with switch to degraded perception operation (per illustration 804). In illustration 802, the LA point 408 extends beyond a perception range of the vehicle 100 such that the motion planner 304 is attempting to create the commanded trajectory 314 using a LA point that is beyond the perception range. This results on the vehicle trajectory 806 departing from the lane center 808 and potentially heading into a roadside curb or barriers on a left side of the lane. In the configuration of illustration 802, the vehicle control system 10 would request that a human driver take over operations. In illustration 804, a reduced LA point 310 is set at the motion planner 304 ad the lateral controller 306, which allows the vehicle trajectory 806 and the lane center to be aligned and allows continued autonomous driving operation.

In the various embodiments described herein, a single LA point is described. In some embodiments, a plurality of LA points may be used. In such a case, the LA point described herein is an array of LA points. When a plurality of LA points is generated by the lateral controller 306 at which the tracking error is assessed by the tracked error module 606, it is the LA point that is furthest from the vehicle 100 that is used by the motion planner 304 to determine whether there is a degraded perception condition as described herein. In this case, if the furthest of the LA points is beyond the perception range, then a degraded condition is determined.

Methods and systems are described herein for trajectory adaptation under degraded lane marker view range and quality conditions. A methodology is provided for maintaining lane centering control under conditions where lane marker quality is degraded and/or maximum view range is significantly reduced. In embodiments, a closed loop system is disclosed including planning and control logic. The closed loop system may operate as follows. When the quality or range of marker detection is reduced below a minimal critical threshold, where no viable trajectory can be constructed, a motion planner communicates a need for degraded operation and new planning constraints. A lateral controller responds by bringing a Look Ahead (LA) point closer to the vehicle to fit under operational thresholds specified by the motion planner, thus reducing control accuracy constraints. In parallel with reducing LA distance, the motion planner executes a closed-loop velocity reduction, which allows increase in control accuracy at reduced LA position. The lateral controller communicates new constraints relative to achieved velocity, which allows to establish a hard limit on the maximum control quality reduction required to maintain automated operation of the vehicle.

The systems and methods disclosed herein introduce a feedback loop between the motion planner and the lateral controller, where the motion planner has the ability to request modification of control constrains in recognition of its own inability for constructing a viable trajectory. The systems and methods provide a mechanism to exit a constraint lowering loop once a system stability point is achieved, thereby preventing continued reduction of control capability. The systems and methods provide trajectory shaping in recognition of perception degradation for control maintainability, which offers a planning for success concept where the motion planner considers the lateral controllers capability in executing a plan and adjusts it accordingly such that the requested motion profile can be fulfilled successfully. An adaptive strategy is provided that dynamically adjusts control constraints, parameters, and a look-ahead horizon in response to variations and quality of the desired trajectory.

The systems and methods recognize conditions under which an optimal trajectory cannot be calculated given current control constraints and determines minimum viable constraints for control continuity. The motion planners calculates a trajectory within a new constraint envelope. A methodology is disclosed for continuously updating control and planning parameters for calculation of the trajectory which asymptotically approaches optimal operational conditions during degraded system mode of operation. This is facilitated by the following features. The motion planner identifies an inability to shape a trajectory in optimal fashion within current constraint set established by the lateral controller. The motion planner communicates a request for lowering the constraints to feasible level per current availability of perception data. The lateral controller responds to the request and establishes new operational thresholds which are communicated back to the motion planner. The motion planner calculates the trajectory with consideration of new thresholds established by the lateral controller. The motion planner additionally causes deceleration of host vehicle supporting one of the following features. Further lowering control thresholds in case of further view range degradation allowing to maintain control of the vehicle in ever increasing severity of lane marker view range/quality degradation. Increasing control thresholds in case where view range/quality of marker detection has stabilized at some degraded level preventing unnecessary degradation of vehicle control.

The systems and methods described herein allow an increased availability of the lane centering system and improve the control and increases the duration of time provided to bring a driver back into the loop.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle control system for a vehicle, comprising:
   a sensing system configured to provide vehicle dynamics data;
   a perception system configured to provide perception data representing a forward looking scene of the vehicle;
   an Electronic Power Steering (EPS) system;
   at least one processor in operable communication with the perception system, the sensing system and the EPS system, the at least one processor configured to execute program instructions, wherein the program instructions are configured to cause the at least one processor to implement a motion planner and a lateral controller in a control loop, wherein the program instructions are further configured to cause the at least one processor to:
   execute a first mode:
   wherein the motion planner is configured to determine a desired trajectory based on the perception data and to provide the desired trajectory to the lateral controller and the lateral controller is configured to generate control commands for the EPS system based on an error between the desired trajectory and an actual trajectory at a first look-ahead (LA) point, wherein the actual trajectory is determined by the lateral controller based on a vehicle dynamics model and the vehicle dynamics data;

wherein the motion planner is configured to receive lane information from the perception system including a range of the lane information;

wherein the motion planner is configured to receive the first LA point from the lateral controller; and wherein the motion planner is configured to compare the first LA point and the range to determine whether the range extends to a range end point that is closer to the vehicle than the first LA point; and the program instructions configured to cause the at least one processor to switch to a second mode in response to determining that the range extends to a range end point that is closer to the vehicle than the first LA point;

in the second mode:
   the motion planner configured to request the lateral controller to provide a closer LA point relative to the vehicle;
   the lateral controller configured to determine the closer LA point and send the closer LA point to the motion planner, wherein the lateral controller is configured to generate the control commands for the EPS system based on the error between the desired trajectory and the actual trajectory at the closer LA point; and
   the motion planner configured to generate the desired trajectory based on the perception data and the closer LA point.

2. The vehicle control system of claim 1, wherein the lane information includes lane markers that have been classified and located by the perception system.

3. The vehicle control system of claim 1, wherein the program instructions are configured to cause the at least one processor to implement a longitudinal controller, wherein the motion planner is configured to request a velocity decrease to the longitudinal controller in response to switching to the second mode.

4. The vehicle control system of claim 3, wherein the motion planner is configured to simultaneously:
   request the velocity decrease to the longitudinal controller, and
   request the lateral controller to provide the closer LA point relative to the vehicle.

5. The vehicle control system of claim 1, wherein the motion planner is configured to generate the desired trajectory based on the perception data and the first LA point in the first mode and the closer LA point in the second mode by combining first and second curves at the first LA point in the first mode and combining the first and second curves at the closer LA point in the second mode.

6. The vehicle control system of claim 1, wherein the first LA point is determined by the lateral controller as a function of speed and curvature of the vehicle as provided in the vehicle dynamics data in the first mode and wherein the closer LA point is determined as a function of speed and curvature of the vehicle as provided in the vehicle dynamics data and a reduction factor in the second mode.

7. The vehicle control system of claim 3, wherein a rate of change of the velocity decrease is rate limited.

8. The vehicle control system of claim 1, wherein the program instructions configured to cause the at least one processor to return to the first mode in response to determining that the range extends to a range end point that is further away from the vehicle than the first LA point.

9. The vehicle control system of claim 1, wherein the motion planner is configured to request the lateral controller to provide a closer LA point relative to the vehicle and includes the range in the request and wherein the lateral controller is configured to determine the closer LA point using the range.

10. A method of controlling a vehicle, the method comprising:
   in a first processor executed mode:
      a motion planner of the vehicle determines a desired trajectory based on perception data provided by a perception system of the vehicle, wherein the perception data is representative of a forward looking scene of the vehicle, the motion planner provides the desired trajectory to a lateral controller of the vehicle and the lateral controller generates control commands for an Electronic Power Steering (EPS) system of the vehicle based on an error between the desired trajectory and an actual trajectory at a first look-ahead (LA) point, wherein the actual trajectory is determined by the lateral controller based on a vehicle dynamics model and vehicle dynamics data provided by a sensing system of the vehicle;
      the motion planner receives lane information from the perception system including a range of the lane information;
      the motion planner receives the first LA point from the lateral controller; and
      the motion planner compares the first LA point and the range to determine whether the range extends to a range end point that is closer to the vehicle than the first LA point; and
   the method includes switching to a second processor executed mode in response to determining that the range extends to a range end point that is closer to the vehicle than the first LA point;
   in the second processor executed mode:
      the motion planner requests the lateral controller to provide a closer LA point relative to the vehicle;
      the lateral controller determines the closer LA point and sends the closer LA point to the motion planner, wherein the lateral controller generates the control commands for the EPS system based on the error between the desired trajectory and the actual trajectory at the closer LA point; and
      the motion planner generates the desired trajectory based on the perception data and the closer LA point.

11. The method of claim 10, wherein the lane information includes lane markers that have been classified and located by the perception system.

12. The method of claim 10, wherein the motion planner requests a velocity decrease to a longitudinal controller of the vehicle in response to switching to the second processor executed mode.

13. The method of claim 12, wherein the motion planner simultaneously:
   requests the velocity decrease to the longitudinal controller, and
   requests the lateral controller to provide the closer LA point relative to the vehicle.

14. The method of claim 10, wherein the motion planner generates the desired trajectory based on the perception data and the first LA point in the first mode and the closer LA point in the second mode by combining first and second curves at the first LA point in the first mode and combining the first and second curves the closer LA point in the second mode.

15. The method of claim 10, wherein the first LA point is determined by the lateral controller as a function of speed and curvature of the vehicle as provided in the vehicle dynamics data in the first mode and wherein the closer LA point is determined as a function of speed and curvature of the vehicle as provided in the vehicle dynamics data and a reduction factor in the second mode.

16. The method of claim 12, wherein a rate of change of the velocity decrease is rate limited.

17. The method of claim 10, comprising returning to the first mode in response to determining that the range extends to a range end point that is further away from the vehicle than the first LA point.

18. The method of claim 10, wherein the motion planner requests the lateral controller to provide a closer LA point relative to the vehicle and includes the range in the request and wherein the lateral controller determines the closer LA point using the range.

19. A vehicle, comprising:
   a sensing system configured to provide vehicle dynamics data;
   a perception system configured to provide perception data representing a forward looking scene of the vehicle;
   an Electronic Power Steering (EPS) system;
   at least one processor in operable communication with the perception system and the EPS system, the at least one processor configured to execute program instructions, wherein the program instructions are configured to cause the at least one processor to implement a motion planner and a lateral controller in a control loop, wherein the program instructions are further configured to cause the at least one processor to:
   execute a first mode:
      wherein the motion planner is configured to determine a desired trajectory based on the perception data and to provide the desired trajectory to the lateral controller and the lateral controller is configured to generate control commands for the EPS system based on an error between the desired trajectory and an actual trajectory at a first look-ahead (LA) point, wherein the actual trajectory is determined by the lateral controller based on a vehicle dynamics model and the vehicle dynamics data; and
   wherein the motion planner is configured to receive lane information from the perception system including a range of the lane information;
   wherein the motion planner is configured to receive the first LA point from the lateral controller; and
   wherein the motion planner is configured to compare the first LA point and the range to determine whether the range extends to a range end point that is closer to the vehicle than the first LA point; and
   the program instructions configured to cause the at least one processor to switch to a second mode in response to determining that the range extends to a range end point that is closer to the vehicle than the first LA point;
   in the second mode:
      the motion planner configured to request the lateral controller to provide a closer LA point relative to the vehicle;
      the lateral controller configured to determine the closer LA point and send the closer LA point to the motion planner, wherein the lateral controller is configured to generate the control commands for the EPS system based on the error between the desired trajectory and the actual trajectory at the closer LA point; and
      the motion planner configured to generate the desired trajectory based on the perception data and the closer LA point.

20. The vehicle of claim 19, wherein the motion planner is configured to request the lateral controller to provide a closer LA point relative to the vehicle and includes the range in the request and wherein the lateral controller is configured to determine the closer LA point using the range.

* * * * *